Oct. 27, 1925.  
O. I. WARING  
1,559,523  
TOOTH CLEANING DEVICE  
Filed Aug. 11, 1924

INVENTOR  
Olaf I. Waring  
BY  
ATTORNEYS

Patented Oct. 27, 1925.

1,559,523

UNITED STATES PATENT OFFICE.

OLAF I. WARING, OF LONG ISLAND CITY, NEW YORK, ASSIGNOR TO AMERICAN DRUGGISTS SYNDICATE, OF LONG ISLAND CITY, NEW YORK, A CORPORATION OF NEW YORK.

TOOTH-CLEANING DEVICE.

Application filed August 11, 1924. Serial No. 731,350.

*To all whom it may concern:*

Be it known that I, OLAF I. WARING, a citizen of the United States, residing at 154 Eleventh Street, Long Island City, county of Queens, and State of New York, have invented new and useful Improvements in Tooth-Cleaning Devices, of which the following is a specification.

This invention relates essentially to a device for cleaning teeth which is sanitary and inexpensive, so that it can be sold with a dentifrice without appreciable increase in cost.

The invention is designed to provide a device having a soft tubular rubber end suitable for rubbing over the teeth of a person, in combination with a moist cleanser such as dental cream placed in the tubular end.

The fundamental objects of the invention are to provide means at the rubbing end of the device for receiving a predetermined quantity of the dentifrice for cleaning a set of teeth and to have a tooth cleaning device which will readily enter between the teeth without cutting or bruising the gums of the user.

The invention resides more particularly in the novel combinations hereinafter described and claimed, reference being made to the accompanying drawing in which:

Figure 1:
Fig. 1 represents a side elevation of a device embodying this invention.
Figure 2:
Fig. 2 is a vertical section of the lower end of the device.

In the drawing the numeral 5 designates a handle which is preferably made of hard rubber or wood. The lower part of the handle has a stem 6 of smaller diameter so as to provide means for fastening by cementing or otherwise fixing to it a member 7 made of pliable rubber tubing.

The tubular member is about the same diameter as the handle so as to give an unbroken or flush joint 8 to prevent lodgment of dirt and to permit it to be easily cleaned. The stem projects into the upper part of the tube and the lower portion of the latter serves as a receptacle for receiving a small quantity of tooth paste or dental cream.

When using the device the receptacle is filled and the tubular end is brushed over the teeth the movement back and forth bends the tubular end below the stem from right to left thereby gradually squeezing out the paste to mix with the saliva.

Figure 3:
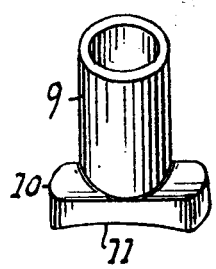
Fig. 3 is a perspective view of a modification.
Figure 4:
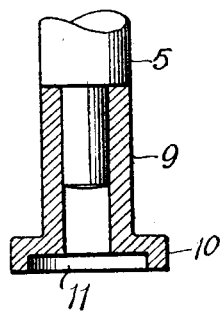
Fig. 4 is a vertical section of Fig. 3.

As indicated in Fig. 3 the lower end of the tubular member 9 is provided with an elongated lower portion 10 to give more surface to contact with the teeth and its bottom 11 is concaved to fit the curvature or profile of the teeth.

I claim:

1. A tooth cleaning device comprising a handle, a tubular elastic member fixed to the handle with the handle closing the engaged end, a portion of said elastic member extending beyond said handle and adapted to receive a dentifrice in the pocket so formed.

2. A tooth cleaning device comprising a handle, a tubular elastic member fixed to the handle with the handle closing the engaged end, a portion of said elastic member extending beyond said handle and adapted to receive a dentifrice in the pocket so formed, said member terminating at one end with a transverse extension presenting an outer arcuate working face.

In testimony whereof I have hereunto set my hand.

OLAF I. WARING.